UNITED STATES PATENT OFFICE.

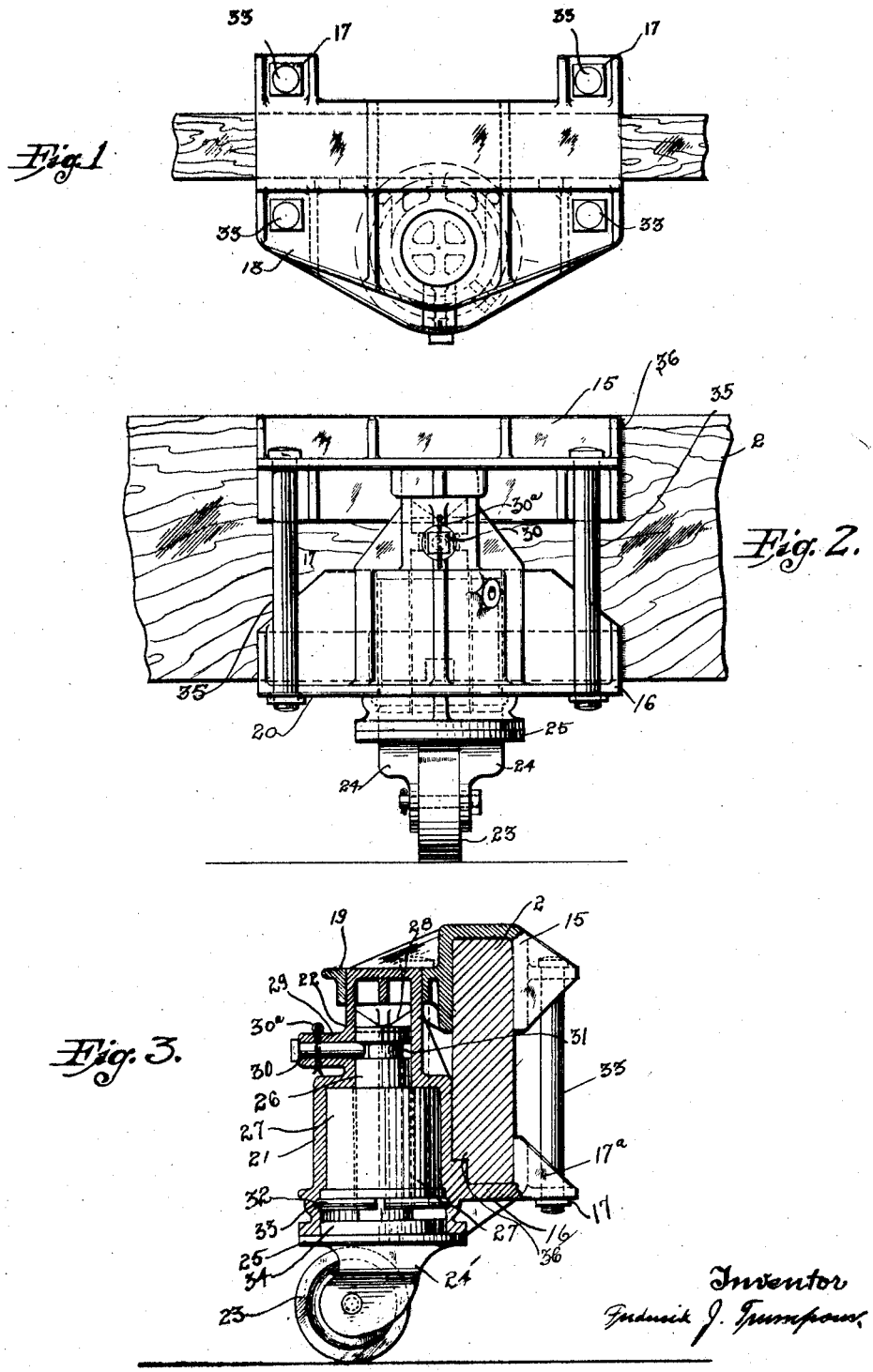

FREDERICK J. TRUMPOUR, OF WASHINGTON, DISTRICT OF COLUMBIA, ASSIGNOR TO NEWTON D. BAKER, SECRETARY OF WAR.

ATTACHING MEMBER FOR AXLE AND CASTER HOUSINGS FOR TRUCKS.

1,338,657.  Specification of Letters Patent.  Patented Apr. 27, 1920.

Application filed September 26, 1919. Serial No. 326,673.

(FILED UNDER THE ACT OF MARCH 3, 1883, 22 STAT. L., 625.)

*To all whom it may concern:*

Be it known that I, FREDERICK J. TRUMPOUR, a citizen of the United States, stationed at Washington, District of Columbia, have invented an Improvement in Attaching Members for Axle and Caster Housings for Trucks, of which the following is a specification.

The invention described herein may be used by the Government, or any of its officers or employees in prosecution of work for the Government, or by any other person in the United States, without payment of any royalty thereon.

This invention relates to housings for axles, casters and the like, together with novel attaching means therefor. In particular, the invention covers improved means of attaching the housing for bearings for the axles or casters of trucks, to the sills of the truck frame.

One object of the invention is to provide improved attaching members for axle or caster housings, by the use of which the sill of the truck will not be weakened due to the boring of holes there through or the excessive cutting away of material in order to attach the housings.

Another object of the invention is to provide an improved attaching means which shall be adjustable to accommodate sills of different sizes, and also to take care of shrinkage of the sill itself as well as providing means for taking up wear in the sill.

Another object of the invention is to provide a form of housing attachment in which transverse and longitudinal strains will be transmitted from the wheels to the sills through large surfaces of contact, thereby reducing the wear on the sills and providing a construction of great strength and rigidity.

Further objects to be accomplished by the use of the novel device will appear from time to time in the following description and in the appended claims.

For a better understanding of the invention, reference is to be made to the accompanying drawings showing various embodiments of the invention in various uses.

Figure 1 is a plan view of the device modified to be used to attach a housing for a caster;

Fig. 2 is a side elevation of the device shown in Fig. 1;

Fig. 3 is a cross-sectional view of the device as shown in Fig. 2.

With reference now to the drawings, the use of the novel attaching device for the purpose of securing a caster housing to a truck sill, is clearly indicated in Figs. 1, 2 and 3.

To attach a housing for a caster to the truck, the device is used in the form as shown in Figs. 1, 2 and 3. The caster housing is mounted on the sill 2 by means of a pair of attaching members 15 and 16. The upper member 15 is U-shaped in cross-section and fits over and partially incloses the sill. Along one leg of the U there are provided projecting ears 17, 17 drilled for bolts. On the other leg of the U there is provided a ledge 18 drilled at its extremities for bolts and provided at approximately its middle point with an aperture 19 to serve as a means of support for a member inclosing the caster bearing. The lower attaching member 16 has on one leg of the U a pair of ears 17ª similar to ears 17, 17 and similarly drilled. On the other leg there is a projecting bracket 20 with bolt holes at either end.

Midway of the ends the bracket 20 is provided with a socket member 21 the axis of which is vertical and substantially parallel to the sill. The socket member 21 has a portion 22 of reduced diameter at its upper end to fit the aperture 19 in the member 15.

The caster of the usual type is provided with a wheel 23 mounted on a pin between lugs 24. Lugs 24 are attached to the under side of a guard ring 25, formed integrally with the pintle 26 of the caster proper. Pintle 26 is surrounded at its lower end by a bearing 27, which may be either cylindrical in form, as shown, or in the form of a cage containing a plurality of rollers. The bearing 27 is designed to fit socket member 21.

The pintle 26 extends beyond the end of the bearing cylinder and into the portion 22 of the member 21, with which it makes a close fit. In the top of the portion 22 there is provided a pointed bearing 28, formed as a separate casting or forging of hardened metal and slipped into place, point down, in portion 22. The top of the pintle rests against the point bearing and the top surface is suitably hardened or otherwise treated to make a satisfactory bearing surface.

As shown at 29, the member 22 is provided with a right angularly extending projection drilled for a locking pin 30, which passes therethrough and is held in place by a cotter pin 30ª. The pin 30 extends into an annular channel 31, cut into the surface of the pintle above the bearing 27 and prevents the pintle from being withdrawn from the housing when the caster is in use.

Near the lower end of socket member 21, just below the vertical cylindrical cage bearing, there is provided a circular recess 32, cut in the inner surface of the socket member. A lock ring 33, made of a round steel rod bent to form a circle of slightly larger outside diameter than the recess, is provided to snap into the recess to hold the cylindrical bearing in place.

As indicated at 34, the pintle has an enlarged portion at its lower end fitting closely in socket member 21, and beneath the lower edge of member 21 the pintle has formed integrally therewith a guard ring 25, serving to keep dirt from getting into the bearing members.

The attaching members 15 and 16 are drawn together so as to maintain a firm grip on the sill 2 by means of bolts 35. Two of these bolts are provided to pass through the ears 17 and 17ª, and a second pair passes through the ledge 18 and bracket 20. By means of these bolts it will be seen that it is possible to adjust the attached members to sills of different depths. The members 15 and 16 may be drawn closer together without difficulty, inasmuch as the socket member 22 of the attaching member 16 moves freely in the aperture 19 in ledge 18. This arrangement of the various members gives a firm means of attachment and the same advantages as set forth in connection with the housing for the axle. As indicated at 36, the sill is gained to fit a projecting lug, formed integrally with the lower attaching member. This provides an anchoring means for the caster housing attaching device.

At the top of the sill, as indicated at 36, there is cut a shallow recess in the body of the sill into which the attaching member 15 fits. This serves the purpose of anchoring the member 15 and also prevents the member 15 from projecting above the top surface of the sill in such a way as to prevent the floor boards of the truck from being laid with a flat surface.

It is especially desirable in devices for the attachment of casters that a rigid mounting be secured, and this is obtained in the invention here set forth by the unusually large contact surface between the attaching members and the truck sill. This large area, furthermore, reduces the wear of the sill caused by the shocks of ordinary use.

It is clear, further, that in each type of housing attachment there is provided an attaching device which may be firmly secured to the truck without weakening the sills by the cutting away of material. In the devices of the type now commonly used it is customary to drill a hole completely through the sill in which the tightening bolt is placed. As the sill is likely to be more or less thin, this weakens the construction materially. The present invention avoids all these disadvantageous features and provides a device of unusual utility and convenience.

While the preferred forms of the invention have been here described, it is to be understood that the novel device is not limited to these forms, but is susceptible of further modifications within the scope of the appended claims.

Having thus described my invention, what I claim as new and desire to secure by Letters Patent is:

1. In a truck in combination, a sill, upper and lower attaching members partially inclosing said sill, a housing for a movable element mounted on said lower member, said housing being provided with a portion of reduced diameter, an apertured bracket on said upper attaching member, adapted to receive and support said portion in said aperture, and binding means located externally to said sill to cause said members to grip said sill.

2. In a truck, a sill, upper and lower attaching members partially inclosing said sill, a movable element, a housing mounted on said lower attaching member adapted to receive said element, an apertured bracket mounted on said upper attaching member adapted to receive and support the reduced portion of said housing, an annular groove in the movable element, a retaining pin mounted in said housing to coöperate with said groove, and binding means located externally to said sill to cause said attaching members to grip said sill.

FREDERICK J. TRUMPOUR.